(12) United States Patent
Bhosale

(10) Patent No.: US 7,645,937 B2
(45) Date of Patent: Jan. 12, 2010

(54) RECESSED WHILE-IN-USE ELECTRICAL BOX

(75) Inventor: Vikramsinh P. Bhosale, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

(21) Appl. No.: 11/949,844

(22) Filed: Dec. 4, 2007

(65) Prior Publication Data

US 2009/0139742 A1 Jun. 4, 2009

(51) Int. Cl.
*H01H 9/02* (2006.01)
(52) U.S. Cl. .............................. 174/58; 174/57; 174/50; 174/60; 174/135; 220/4.02; 439/535
(58) Field of Classification Search .................... 174/58, 174/57, 63, 50, 60, 135, 481, 480, 502; 220/3.2, 220/3.8, 4.02; 248/906; 439/535
See application file for complete search history.

(56) References Cited

U.S. PATENT DOCUMENTS

| | | | | |
|---|---|---|---|---|
| 3,620,404 | A | * | 11/1971 | Grasso ........................ 220/477 |
| 4,927,039 | A | * | 5/1990 | McNab ........................ 220/3.7 |
| 5,042,673 | A | * | 8/1991 | McShane .................... 220/3.7 |
| 5,170,013 | A | | 12/1992 | Borsh et al. |
| 5,456,377 | A | | 10/1995 | Williams, Jr. |
| 5,533,637 | A | | 7/1996 | Williams, Jr. |
| 6,051,786 | A | | 4/2000 | Gretz |
| 6,239,368 | B1 | | 5/2001 | Gretz |
| 6,268,563 | B1 | | 7/2001 | Gretz |
| 6,355,882 | B1 | | 3/2002 | Gretz |
| 6,570,091 | B1 | | 5/2003 | Kesler et al. |
| 6,700,063 | B2 | | 3/2004 | Shotey et al. |

(Continued)

*Primary Examiner*—Dhiru R Patel
(74) *Attorney, Agent, or Firm*—Daniel P. Malley; Bond, Schoeneck & King, PLLC

(57) ABSTRACT

The present invention is directed to an electrical wiring box assembly that includes an inner wall box including a peripheral inner wall bounded and enclosed by a rear wall and open at a front end of the inner wall box to form an inner volume. The inner wall box also includes an inner wall flange extending in a substantially perpendicular direction from an exterior surface of the peripheral inner wall at predetermined distance from the front inner wall box end. The inner wall flange includes a plurality of apertures formed therein. The inner wall box further includes a plurality of device mounting bosses extending in a substantially perpendicular direction from an interior surface of the rear wall. An intermediate box includes a peripheral intermediate wall portion configured to fit within the inner volume. The peripheral intermediate wall is bounded by a rear ledge extending inwardly and perpendicularly from a back end of the peripheral intermediate wall to form an intermediate volume in communication with the inner volume at the back end and open at a front intermediate wall box end The intermediate box further includes an outer wall flange extending in a substantially perpendicular direction from an exterior surface of the peripheral intermediate wall at predetermined distance from the front end of the peripheral intermediate wall. A rear wall portion of the outer wall flange is configured to abut the front inner wall box end such that the rear edge is substantially aligned with the plurality of device mounting bosses. A cover assembly is removably coupled to the intermediate box, the cover assembly providing access to the intermediate volume in an open position and substantially sealing the intermediate volume and the inner volume in a closed position.

42 Claims, 8 Drawing Sheets

U.S. PATENT DOCUMENTS

| | | |
|---|---|---|
| 6,737,576 B1 | 5/2004 | Dinh |
| 6,878,877 B1 * | 4/2005 | Cozzi et al. .................. 174/53 |
| 6,894,223 B1 | 5/2005 | Shotey et al. |
| 6,908,003 B2 | 6/2005 | Feyes et al. |
| 6,951,983 B1 | 10/2005 | Gretz |
| 6,956,078 B2 | 10/2005 | Cavanaugh et al. |
| 6,956,169 B1 | 10/2005 | Shotey et al. |
| 6,956,171 B1 | 10/2005 | Gretz |
| 6,956,172 B2 * | 10/2005 | Dinh .......................... 174/58 |
| 6,982,381 B1 | 1/2006 | Backofen et al. |
| 7,005,578 B2 | 2/2006 | Gretz |
| 7,044,318 B2 | 5/2006 | Gates, II |
| 7,045,713 B1 * | 5/2006 | Gretz .......................... 174/58 |
| 7,087,837 B1 * | 8/2006 | Gretz .......................... 174/58 |
| 7,109,419 B1 | 9/2006 | Gretz |
| 7,166,801 B1 | 1/2007 | Gretz |
| 7,176,377 B1 * | 2/2007 | Gretz .......................... 174/58 |
| 7,319,192 B1 * | 1/2008 | Gretz .......................... 174/58 |
| 7,388,162 B1 * | 6/2008 | Gretz ......................... 174/480 |
| 7,435,900 B1 * | 10/2008 | Gretz .......................... 174/50 |
| 7,479,598 B1 * | 1/2009 | Shotey ........................ 174/58 |

* cited by examiner

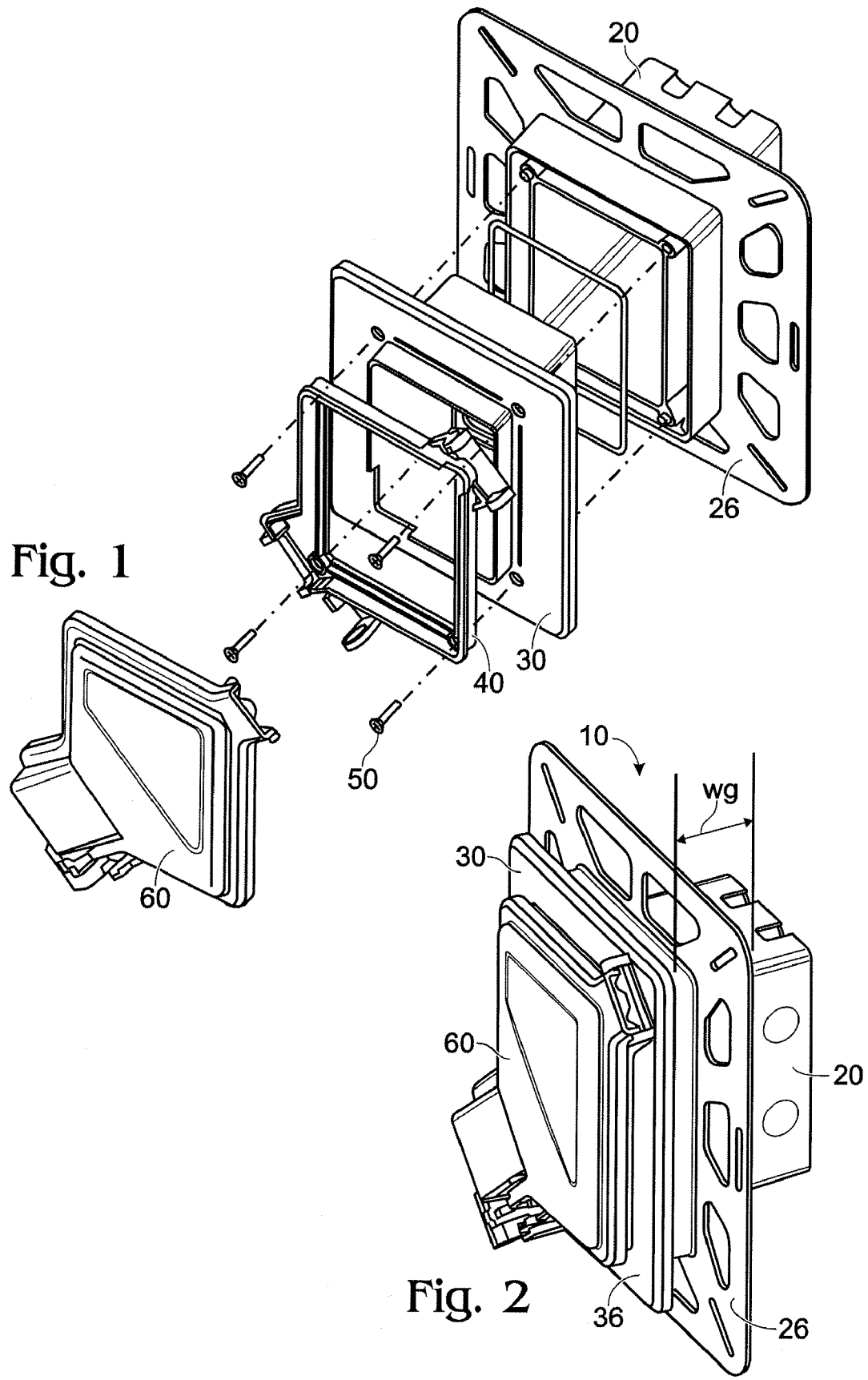

RECESSED WHILE-IN-USE ELECTRICAL BOX

BACKGROUND OF THE INVENTION

1. Field of the Invention

The present invention relates generally to electrical wiring boxes, and particularly to electrical wiring box assemblies.

2. Technical Background

In many cases it is desirable to provide electrical outlets on the exterior wall of both residential and commercial structures. Homeowners, maintenance and repair personnel and contractors require such electrical outlets to provide electrical power to electrically operated appliances, tools and other such devices. Obviously, electrical outlets must be protected in some manner because of the substantial possibility of creating an electrical hazard when the energized outlet comes in contact with water or moisture. An exterior outlet may come in contact with water by any number of ways, such as rainfall, melting snow, or by way of human activity in close proximity to the outlet. Activities such as watering plants and shrubbery, or children playing with the water hose are easily imagined. Moreover, exterior electrical outlets may also be subjected to various contaminants which may also affect the safe operation of the electrical device.

Another consideration that must be accounted relates to the standard installation of electrical wiring devices. Typically, the electrical wiring device is mounted at the top and bottom to bosses formed in a wiring box. Once the fasteners are inserted therein, the face of the electrical wiring device is substantially flush with the wall. Of course, when a user inserts the appliance or tool plug into the receptacle, both the plug and the cord extending therefrom extend outwardly from the wall surface. As such, a small gap is created between the electrical wiring device and the plug itself. This gap may all the admittance of moisture. Moreover, the plug may be partially dislodged as a result of contact by persons or objects. Of course, a partial dislodgement may expose a portion of the energized prongs of the electrical plug causing an electrical safety hazard.

What is needed, therefore, is an electrical wiring box assembly that over comes the drawbacks described above. In particular, an electrical box assembly is needed that prevents moisture and contaminants from coming in contact with the electrical device. An electrical box assembly is needed that provides a recessed plug/device interface that prevents the inadvertent dislodging of the plug.

SUMMARY OF THE INVENTION

The present invention addresses the needs described above by providing an electrical wiring box assembly that overcomes the drawbacks described above. The recessed electrical box assembly of the present invention substantially prevents moisture and contaminants from coming in contact with an electrical device installed therein. The present invention provides a recessed plug/receptacle device interface that prevents the inadvertent dislodging of the plug. Another benefit of recessing the plug/receptacle device interface is that the chance of the interface being exposed to water or contaminants is greatly diminished.

One aspect of the present invention is directed to an electrical wiring box assembly that includes an inner wall box including a peripheral inner wall bounded and enclosed by a rear wall and open at a front end of the inner wall box to form an inner volume. The inner wall box also includes an inner wall flange extending in a substantially perpendicular direction from an exterior surface of the peripheral inner wall at predetermined distance from the front inner wall box end. The inner wall flange includes a plurality of apertures formed therein. The inner wall box further includes a plurality of device mounting bosses extending in a substantially perpendicular direction from an interior surface of the rear wall. An intermediate box includes a peripheral intermediate wall portion configured to fit within the inner volume. The peripheral intermediate wall is bounded by a rear ledge extending inwardly and perpendicularly from a back end of the peripheral intermediate wall to form an intermediate volume in communication with the inner volume at the back end and open at a front intermediate wall box end The intermediate box further includes an outer wall flange extending in a substantially perpendicular direction from an exterior surface of the peripheral intermediate wall at predetermined distance from the front end of the peripheral intermediate wall. A rear wall portion of the outer wall flange is configured to abut the front inner wall box end such that the rear edge is substantially aligned with the plurality of device mounting bosses. A cover assembly is removably coupled to the intermediate box, the cover assembly providing access to the intermediate volume in an open position and substantially sealing the intermediate volume and the inner volume in a closed position.

In another aspect, the present invention is directed to an electrical wiring box assembly that includes a peripheral inner wall bounded and enclosed by a rear wall and open at a front end thereof to form an accessible volume. A wall flange extends in a substantially perpendicular direction from an exterior surface of the peripheral wall at predetermined distance from the front inner wall box end. The wall flange includes a plurality of apertures formed therein, at least some of the plurality of apertures being configured to accommodate fasteners to thereby mount the wall flange to a wall structure. A collar wall extends toward the front end in a substantially perpendicular direction from the wall flange. The collar wall is separated from the peripheral inner wall by a predetermined distance to form a water channel. A plurality of mounting bosses are disposed at predetermined locations within the water channel and at least one drain aperture formed in the collar wall.

In yet another aspect, the present invention is directed to an electrical wiring box assembly that includes a peripheral inner wall bounded and enclosed by a rear wall and open at a front end thereof to form an accessible volume. A wall flange extends in a substantially perpendicular direction from an exterior surface of the peripheral wall at a predetermined distance from the front inner wall box end. The wall flange includes a plurality of apertures formed therein. A pattern is formed in the wall flange such that a viscous material adheres to the wall flange.

In yet another aspect, the present invention is directed to a temporary and disposable cover for use with an electrical assembly. The cover includes a faceplate having a surface area substantially corresponding to a front portion of the electrical assembly. A plurality of sidewalls are integrally formed with the faceplate. The faceplate and the plurality of sidewalls are configured to substantially conform to and cover at least a portion of the electrical assembly. At least one of the plurality of sidewalls includes a reverse draft that is configured to frictionally engage at least one corresponding surface of the electrical assembly such that the disposable cover is attached to the electrical assembly by frictional fit.

In yet another aspect, the present invention is directed to an electrical wiring box assembly that includes an inner wall box having a peripheral inner wall bounded and enclosed by a rear wall and open at a front end of the inner wall box to form an inner volume. The inner wall box also includes an inner wall flange extending in a substantially perpendicular direction from an exterior surface of the peripheral inner wall at predetermined distance from the front inner wall box end. The inner wall flange includes a plurality of apertures formed therein. The inner wall box also includes a plurality of fastening structures coupled to the peripheral inner wall. The inner wall box further includes a plurality of device mounting bosses extending in a substantially perpendicular direction from an interior surface of the rear wall. An intermediate box includes a peripheral intermediate wall configured to fit within the inner volume. The peripheral intermediate wall is bounded by a rear ledge extending inwardly and perpendicularly from a back end of the peripheral intermediate wall to form an intermediate volume in communication with the inner volume at the back end and open at a front intermediate wall box end. The intermediate box further includes an outer wall flange extending in a substantially perpendicular direction from an exterior surface of the peripheral intermediate wall at predetermined distance from the front end of the peripheral intermediate wall. A rear portion of the outer flange wall is configured to abut the front inner wall box end such that the rear edge is substantially aligned with the plurality of device mounting bosses.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 1 is an exploded view of the electrical box assembly in accordance with one embodiment of the present invention;

FIG. 2 is a perspective view of the assembled electrical box assembly shown in FIG. 1;

DETAILED DESCRIPTION

Figure 3:
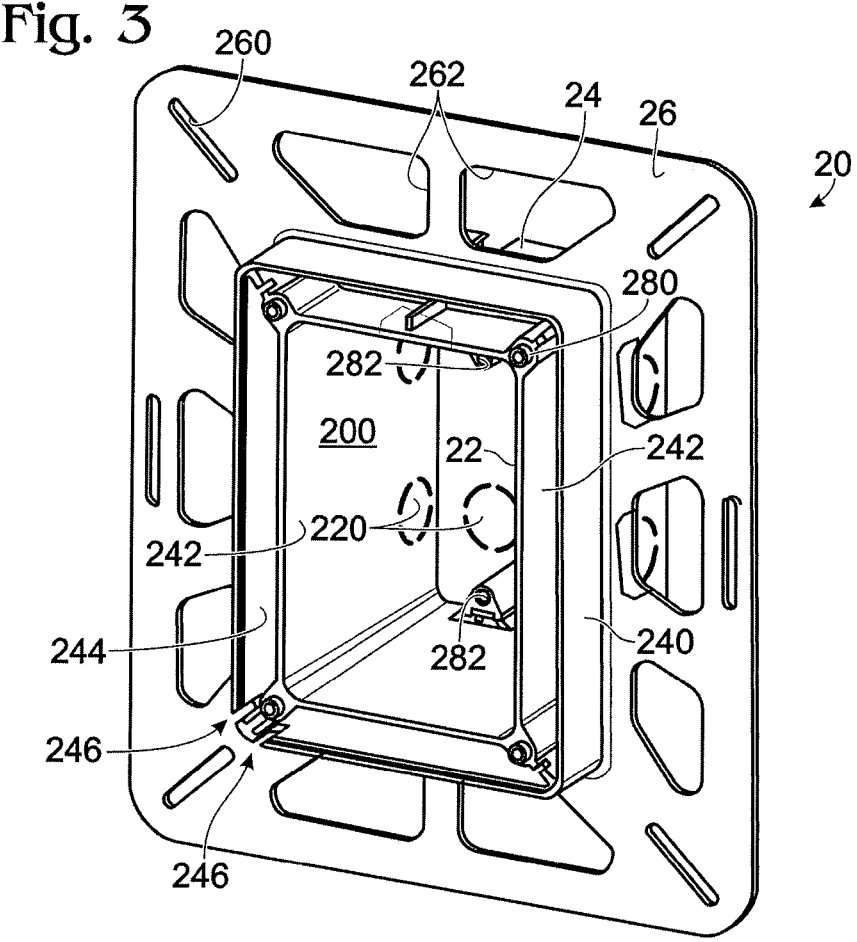
FIG. 3 is a perspective view of the inner box shown in FIG. 1.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the recessed while-in-use electrical box assembly of the present invention is shown in FIG. 1, and is designated generally throughout by reference numeral 10.

As embodied herein, and depicted in FIG. 1, an exploded view of the recessed electrical box assembly 10 in accordance with one embodiment of the present invention is shown. The assembly 10 includes an inner box 20, an intermediate box 30, a cover ring 40, ring mounting screws 50 and a cover member 60. The inner box 20 is configured to be disposed within the wall structure and includes a wall flange 26 that mounts to the wall structure itself. The intermediate box 30 is telescopically disposed within the inner box 20 and is configured to accommodate the electrical wiring device therein. The cover ring 40 is attached to both the intermediate box 30 and the inner box 20 by way of ring mounting screws 50. As such, mounting screws 50 also serve to attach intermediate box 30 to inner box 20. Of course, the cover ring is configured to accommodate cover member 60 therein to complete the assembly 10.

FIG. 2 is a perspective view of the assembled electrical box assembly shown in FIG. 1. Please note that when intermediate box 30 is telescopically inserted into the inner box 20, a gap $W_g$ is formed between the intermediate box flange 36 and the inner box flange 26. The gap $W_g$ is sized to accommodate exterior wall siding. When the box assembly is deployed, the rear portion of the inner box flange 26 is disposed against the wall sheathing and, ultimately, is covered by siding. The intermediate box flange 36 is disposed over the siding, such that the siding is sandwiched between flange 26 and flange 36. The intermediate box flange 36 is, therefore, at least partially visible when the installation of box assembly 10 is completed.

Referring to FIG. 3, a perspective view of inner box 20 is disclosed. Inner box 20 includes a rear wall 22 surrounded by a rear peripheral wall 24 to define a rectangular shaped enclosure 200. The enclosure 200 may include several wiring knock-outs 220. The inner box flange 26 extends outwardly and perpendicularly from the peripheral wall 24. The flange includes slots 260 that are configured to accommodate fasteners. The fasteners are inserted into the slots 260 to thereby mount the inner box 20 to the wall sheathing. Flange 26 also includes holes 262 that allows stucco material to more readily bond with the flange or the wall sheathing exposed inside the holes. The edges of holes 262 or flange 26 may include reverse tapers to allow the stucco material to bond to the edges themselves.

An outer wall portion 240 is a collar structure that extends outwardly from flange 26 in parallel with an inner wall portion 242 that forms the peripheral wall 24. The outer wall collar 240 and the inner wall portion 242 form water channels 244 around the periphery of enclosure 200. The water channels are configured to direct moisture by force of gravity toward drain openings 246. As previously described, the inner box flange 26 is set back a predetermined distance from the front edges of outer wall portion 240 and inner wall portion 242 by a distance substantially less than or equal to gap $W_g$. Those of ordinary skill in the art will understand that there may be dimensional variations in the thickness of the siding. The telescopic interface between the inner box 20 and intermediate box 30 accommodate these variations.

In any event, the inner box 20 includes four (4) screw holes 280 that are configured to receive the fastener screws 50. Of course, the fastener screws connect cover ring 40 to the intermediate box 30 and the inner box 20 together to form the integrated assembly 10. Note also that the inner box 20 includes electrical wiring device mounting bosses 282.

Figure 4:
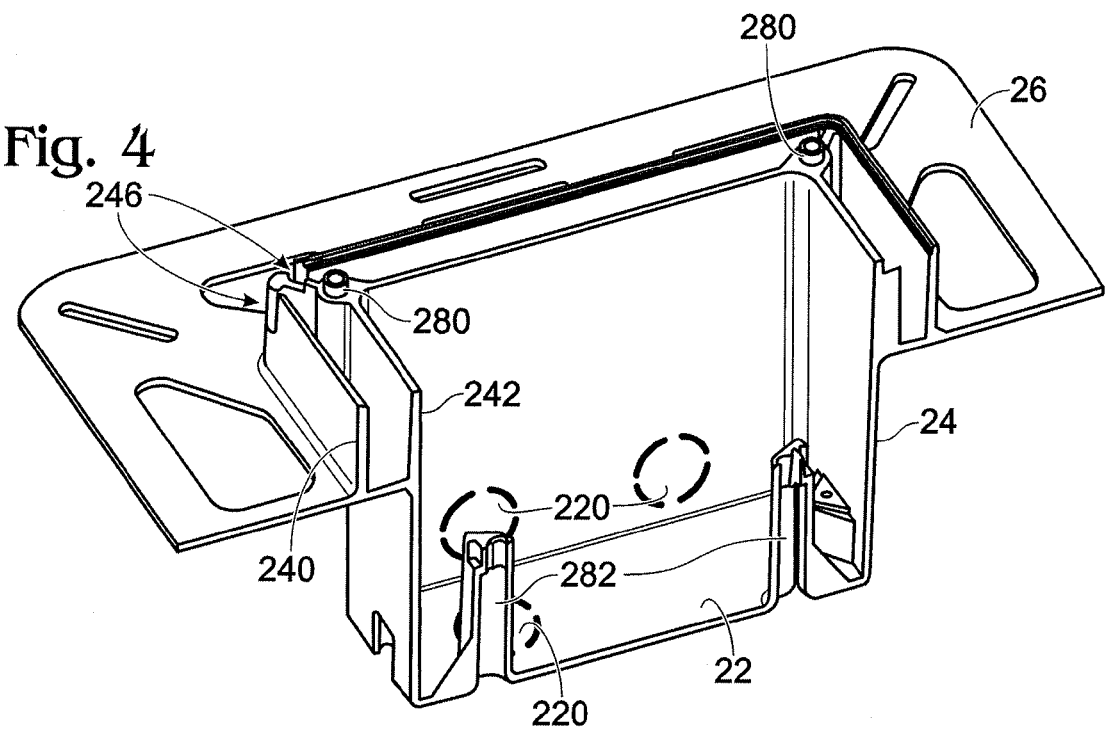
FIG. 4 is a cut-away detail view of the inner box shown in FIG. 3.

FIG. 4 is a cut-away detail view of the inner box 20 shown in FIG. 3. In this cut away view, the water channels 244 and the drain openings 246 are clearly seen. Drain openings 246 are formed on either side of the webbing material that connects the screw hole structures 280 to the corner formed by the intersection of perpendicular sections of the outer wall 240. As alluded to previously, inner wall 242 extends from the front edge of inner box 20 to back wall 22 and essentially forming enclosure 200. The peripheral wall 24 that is visible from the exterior of the inner box 20 is the back portion of the inner wall 242 that extends from behind flange 26. The rear wall 22 includes mounting bosses 282 that are recessed from the front edge of inner wall 242 by a distance that substantially aligns the bosses with recessed inner ledge 34 of intermediate box 30 (See FIG. 5). An electrical wiring device is seated on inner ledge 34 and is secured to mounting bosses 282 with fasteners. The bosses include threaded device mounting holes. The installation is completed by attaching a cover plate to the wiring device. The cover plate and ledge 34 form a moisture barrier. A sealant material or gasket may be disposed in the underside of the cover plate to aid the barrier. In an alternate embodiment, each mounting boss 282 includes a non-threaded device mounting hole and a pocket that accommodates a "quick click" metal insert that allows the screw to be inserted into the device mounting hole and "click" into place. In an alternate embodiment, the electrical wiring device is seated on bosses 282 and secured to mounting bosses 282 with fasteners. The cover plate is attached to the wiring device. The cover plate and ledge 34 form a moisture barrier as previously described.

Figure 5:
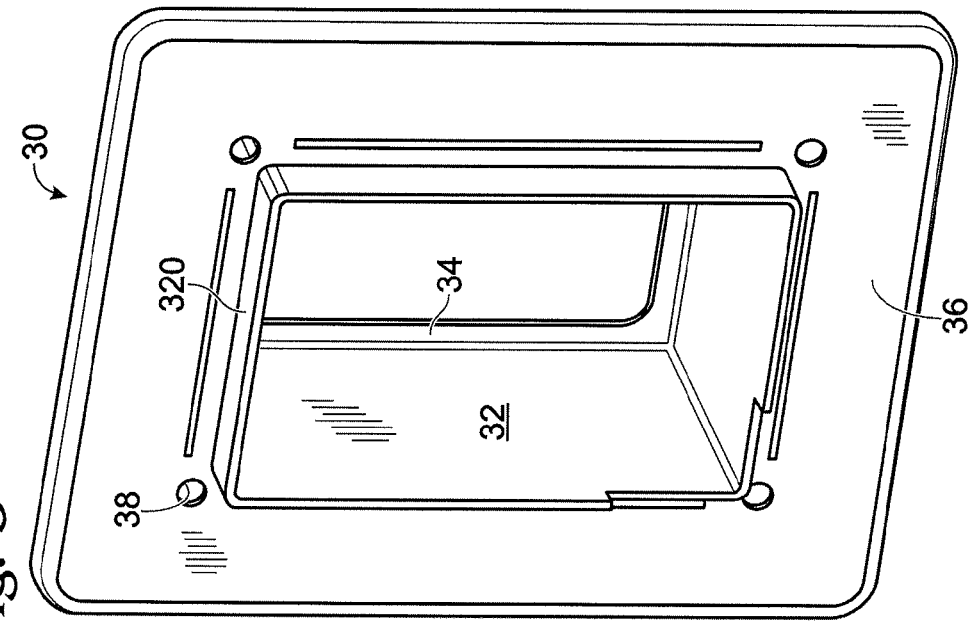
FIG. 5 is a perspective view of the intermediate box shown in FIG. 1.

FIG. 5 is a perspective view of the intermediate box 30. Intermediate box 30 includes the ledge framing member 34 which is surrounded by a peripheral wall 32. The intermediate box 30 is configured to accommodate a standard size wall plate which is seated against ledge 34 after the electrical wiring device has been installed. Peripheral wall 32 has a front edge 320 that defines the front opening of the intermediate box. The cover ring 40 snugly fits over the front edge 320. A flange member 36 extends outwardly and perpendicularly from peripheral walls 32. The flange member 36 includes six (6) holes that are aligned with the screw hole bosses 280 disposed in the inner box 20 and the screw holes disposed in cover ring 40. In other embodiments, the assembly includes four (4) screw holes, bosses, etc. As implied by FIG. 1 and FIG. 2, the rear side of flange 36 is configured to form a water-proof interface with the front edge portion of inner wall 242 and outer wall 240 of inner box 20. Obviously, the water-proof interface is formed only when the intermediate box+ is seated against inner wall 242 and outer wall 240 in the non-telescoped position.

Figure 6:
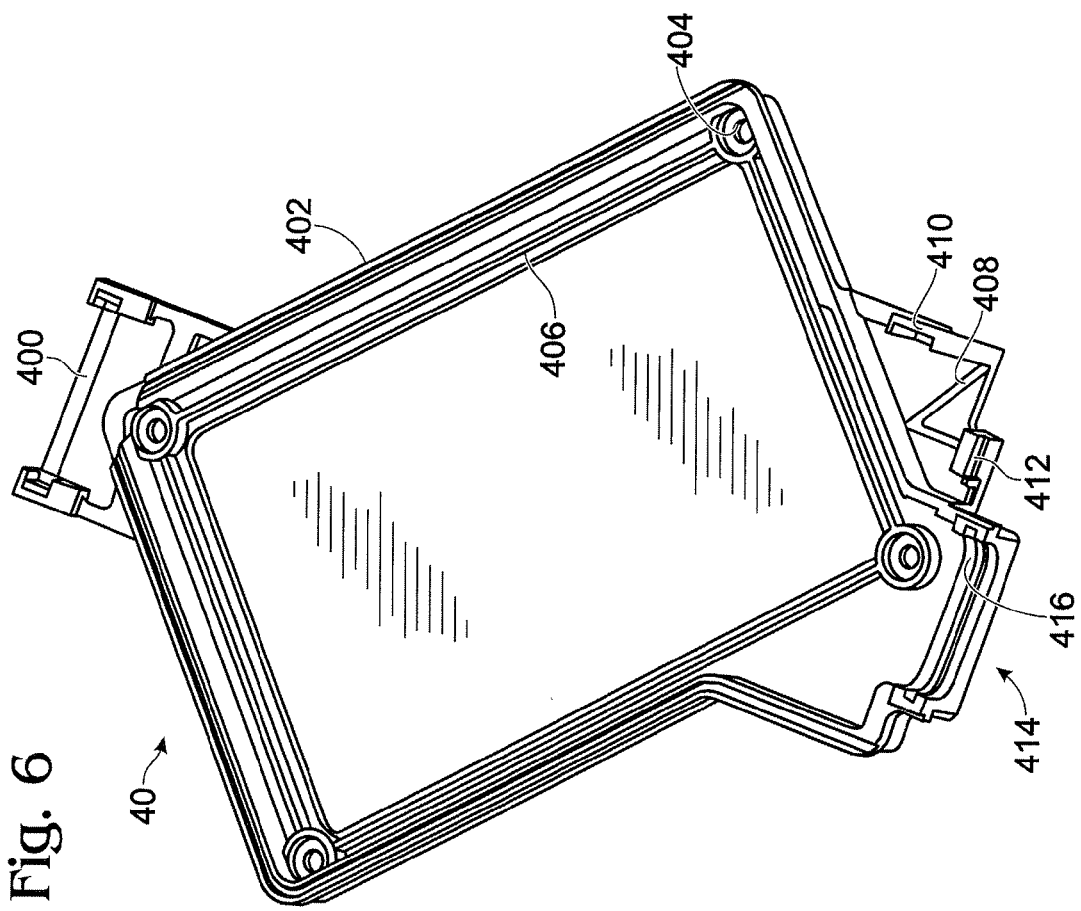
FIG. 6 is a perspective view of the cover ring shown in FIG. 1.

FIG. 6 is a perspective view of the cover ring 40. The cover ring 40 includes a hinge member 400 that mates with a mating hinge element on cover 60. Although the hinge member is shown at the corner of the ring, those skilled in the art appreciate that the hinge member can be located on a side of the ring. A channel 402 is disposed in a portion of the perimeter of ring 40. The channel 402 provides drainage of water that enters between the cover and ring. The ring is configured to provide a water seal when the cover is in the closed position. Ribs 406 are included to provide extra strength to the ring. In this embodiment, four (4) bosses 404 are disposed in the interior of the channel 402. Six (6) bosses may be employed in other embodiments. The bosses are aligned with holes in the intermediate box and bosses 280 disposed in the inner box 20. Screws 50, therefore, are inserted into bosses 404 and are used as a means for assembling the inner box 20, the intermediate box 30 and the cover ring 40 into a single unit. The ring also includes a wire entry portion 414 which includes a gasket pocket 416 and a locking element 410. The wire entry portion 414 includes ribs 408 disposed therein for added strength. Both the wire entry portion 414 and the locking element 410 mate with a corresponding wire entry portion and locking element, respectively, disposed in cover member 60.

Figure 7:
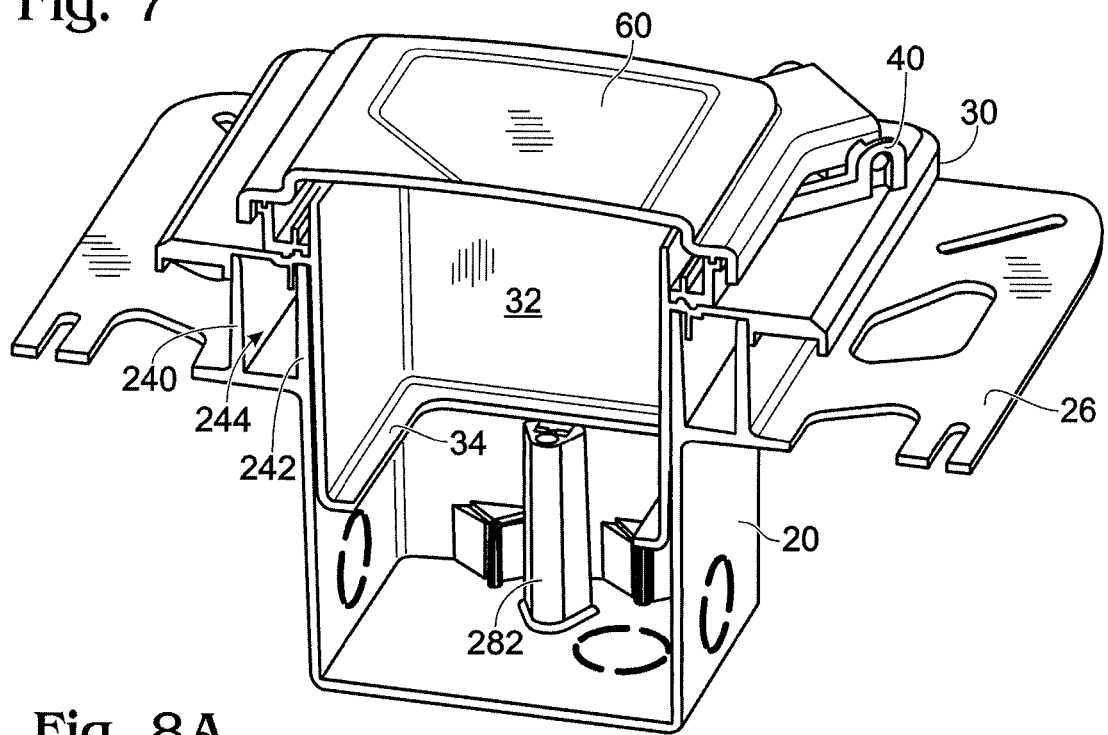
FIG. 7 is a cross-sectional view of the box assembly depicted in FIG. 1 and FIG. 2.

FIG. 7 is a cross-sectional view of the box assembly depicted in FIG. 1 and FIG. 2. As described above, the mounting bosses 282 are disposed on the front edge of inner wall 242 such that an electrical wiring device may be properly seated on bosses 282 or inner ledge 34 of intermediate box 30 and secured to the mounting bosses 282 with fasteners. This view also clearly shows the water channel 244 formed by outer wall 240 and inner wall 242.

Figure 8A:
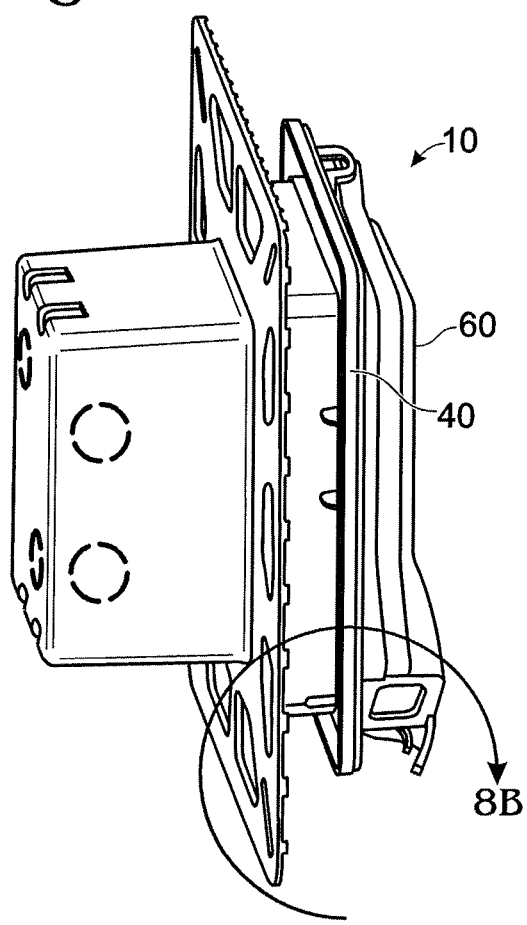
FIG. 8 provides a detail view of the drain openings shown in FIG. 3.
Figure 8B:
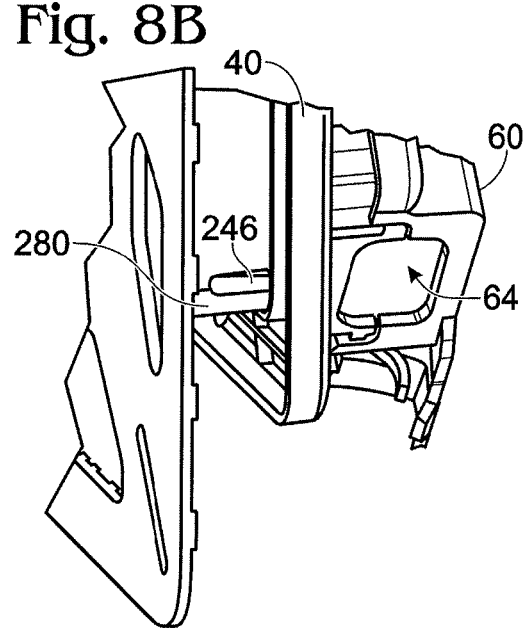

FIG. 8 provides a detail view of the drain openings 246 disposed at the corners of the box assembly 10 near the electric cord opening 64 formed in the cover 60 and cover mounting ring 40. Comparing FIG. 3 and FIG. 8, one skilled in the art will appreciate that there are, in fact, two drain openings 246 at this location. The one that is not viewable in FIG. 8 is disposed behind the corner mounting boss 280.

Figure 9A:
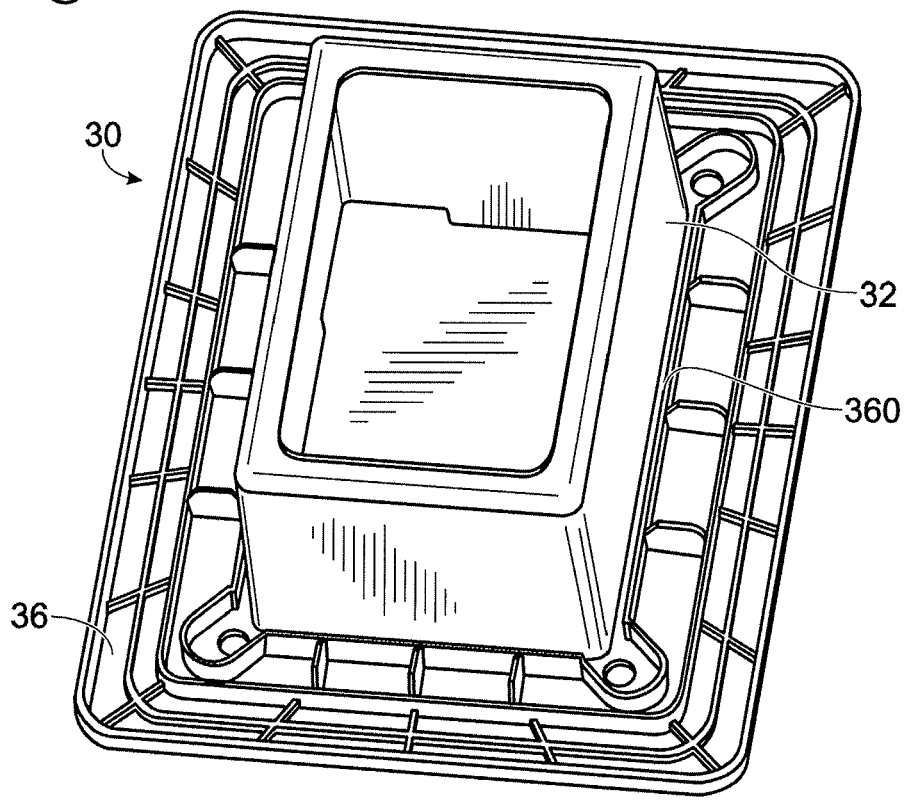
FIGS. 9A-9E are detail views of a gasket arrangement for the intermediate box shown in FIG. 5.
Figure 9C:
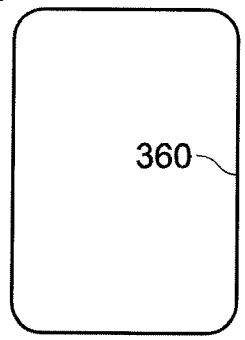
Figure 9D:
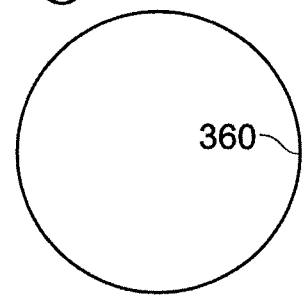
Figure 9E:
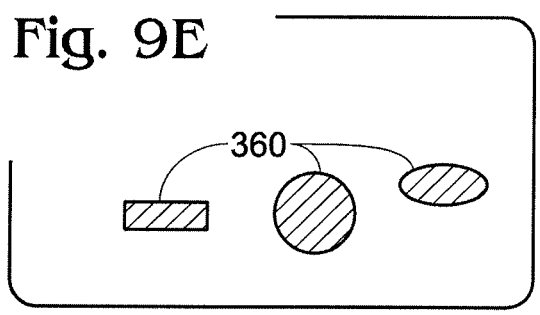
Figure 9B:
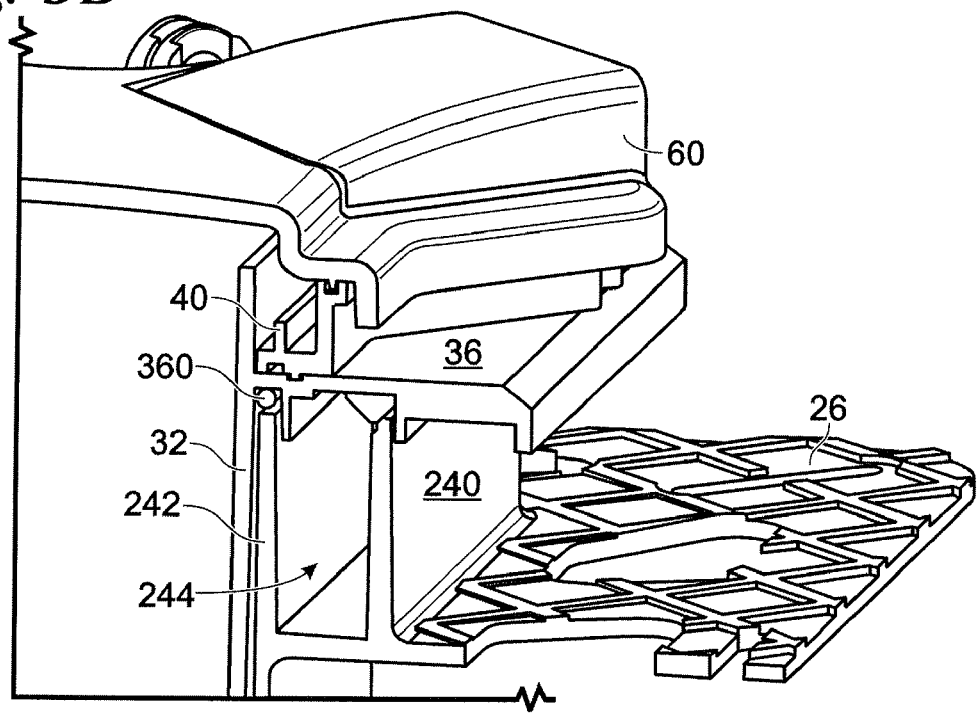

As embodied here in and depicted in FIGS. 9A-9E, detail views of an intermediate box gasket arrangement are depicted. FIG. 9A is a rear perspective view of intermediate box 30. A gasket 360 (or bead of sealant) may be disposed around the perimeter of peripheral wall 36 in the manner shown. Referring to FIG. 9B, the position of the gasket 360 in the context of the fully assembled box assembly 10 is shown. In particular, the gasket 360 prevents moisture from entering the interior of assembly 10 at the location where inner wall 242 (inner box 20) meets the junction of peripheral wall 32 and flange 36. It will be apparent to those of ordinary skill in the pertinent art that modifications and variations can be made to gasket 360 of the present invention depending on cost and manufacturing processes. For example, gasket 360 may be formed using any suitable gasket materials such as EDPM (ethylene propylene diene monomer rubber), fluoroelastomer materials, foam, neoprene rubber, nitrile materials such as Buna-N, and silicone rubber. Gasket 360 may be supplied as a precut length or as a loop.

Referring to FIG. 9C the gasket may conform to the rectangular shape of the peripheral walls 32 or, as depicted in FIG. 9D, may be circular in shape. In the latter example, the gasket 360 is stretched over the box formed by peripheral walls 32 and conforms to its shape by virtue of its inherent elasticity.

Referring to FIG. 9E, gasket 360 may be formed having any suitable cross-section. In the examples depicted, gasket 360 may have a rectangular cross-section, a circular cross-section or an elliptical cross-section. Further, those of ordinary skill in the art will understand that any common cross-section such as circular (solid and hollow), square, rectangular, channel, C-fold, D-section, L-section, P-section, knife-edge, and wedge may be employed herein.

Figure 10:
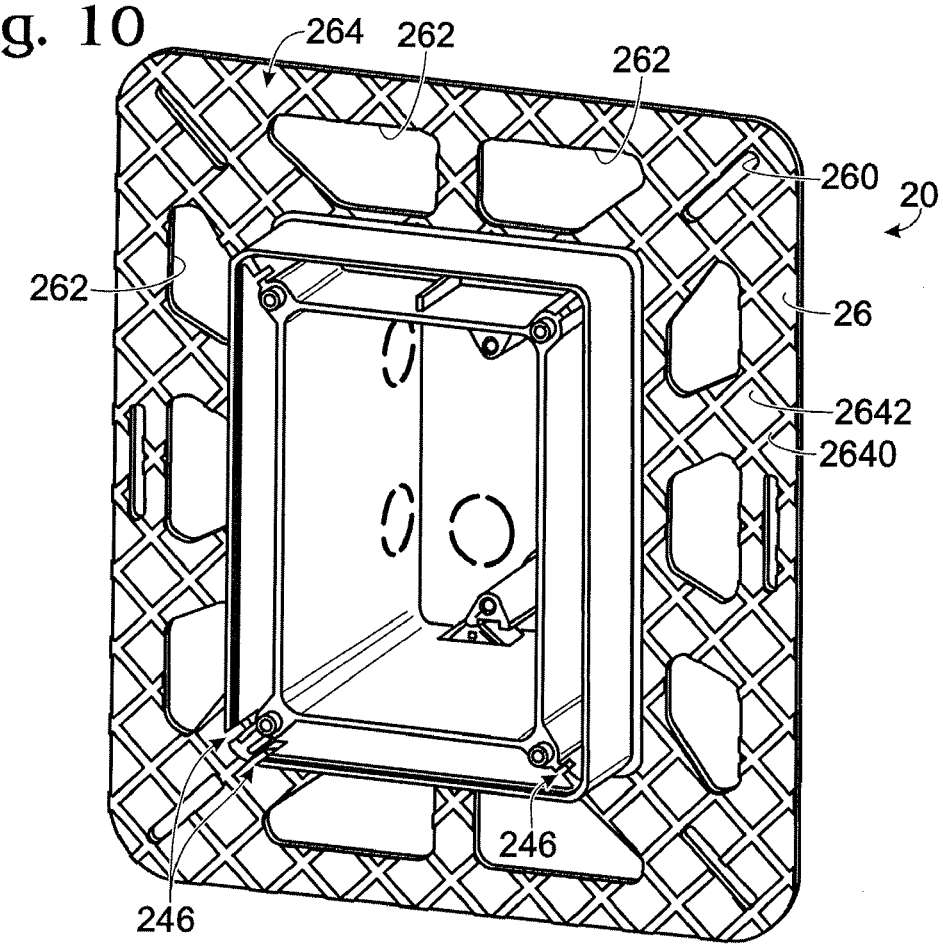
FIG. 10 is a perspective view of the inner box in accordance with a alternate embodiment of the present invention.

FIG. 10 is a perspective view of the inner box in accordance with a alternate embodiment of the present invention. In this embodiment, the flange 26 has a so-called "wire-mesh" pattern 264 formed thereon. The wire-mesh 264 includes raised cross-hatched portions 2640 that form recessed diamond portions 2642. The raised and recessed portions, like the holes 262, allows stucco material to more easily adhere to the flange 26. Stated generally, a pattern 264 is included on flange 26 to allow stucco or other such material to more easily adhere to the flange. Pattern 264 is comprised of an array of troughs, ribs, protrusions, polygonal, irregular or curved shapes, dimples, or points or some combination thereof. Pattern 264 is distributed evenly (or in an alternate embodiment non-evenly) over a portion of flange 26. Flange 26 may in addition include holes 262.

Figure 11A:
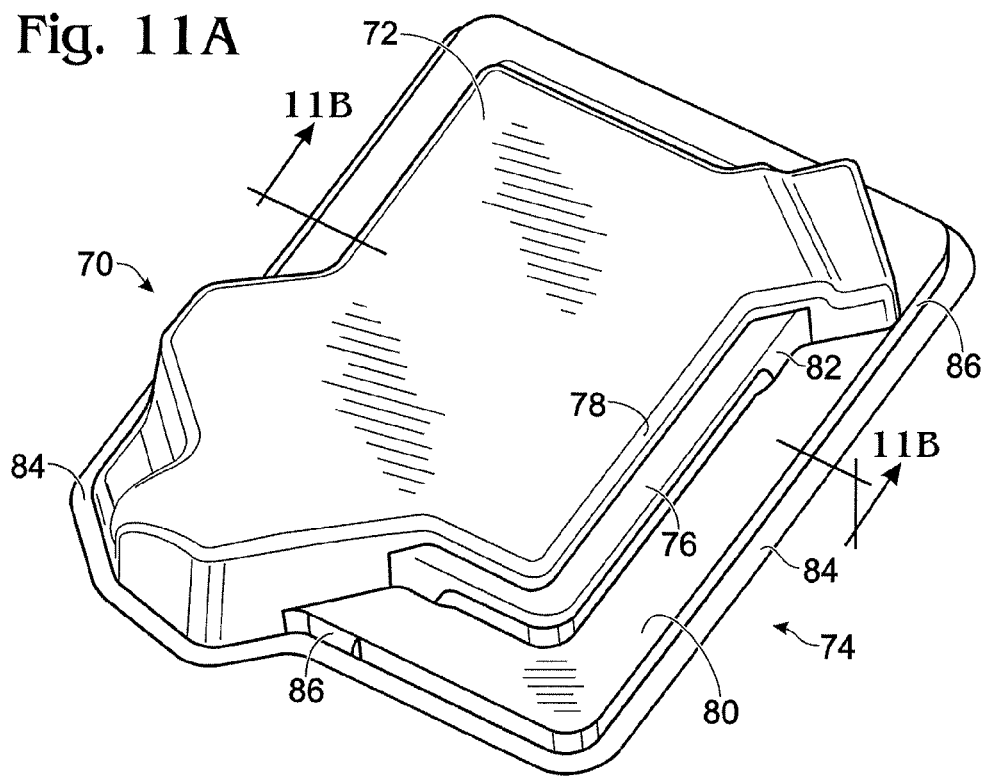
FIGS. 11A-11C are directed to various views of a non-permanent mud cover in accordance with an alternate embodiment of the present invention.
Figure 11B:
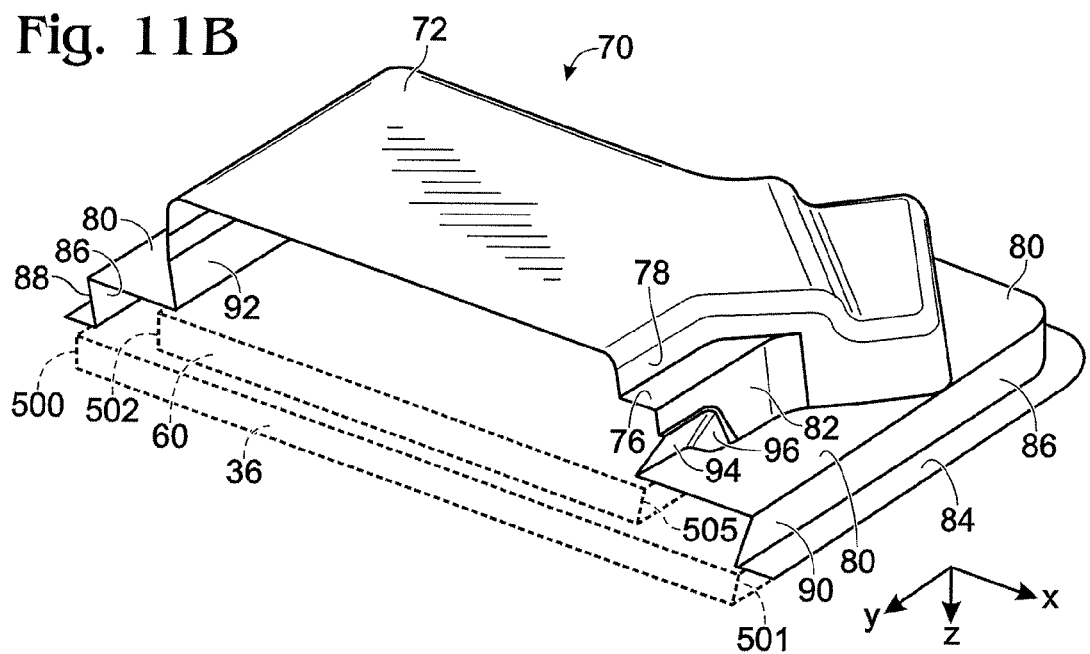
Figure 11C:
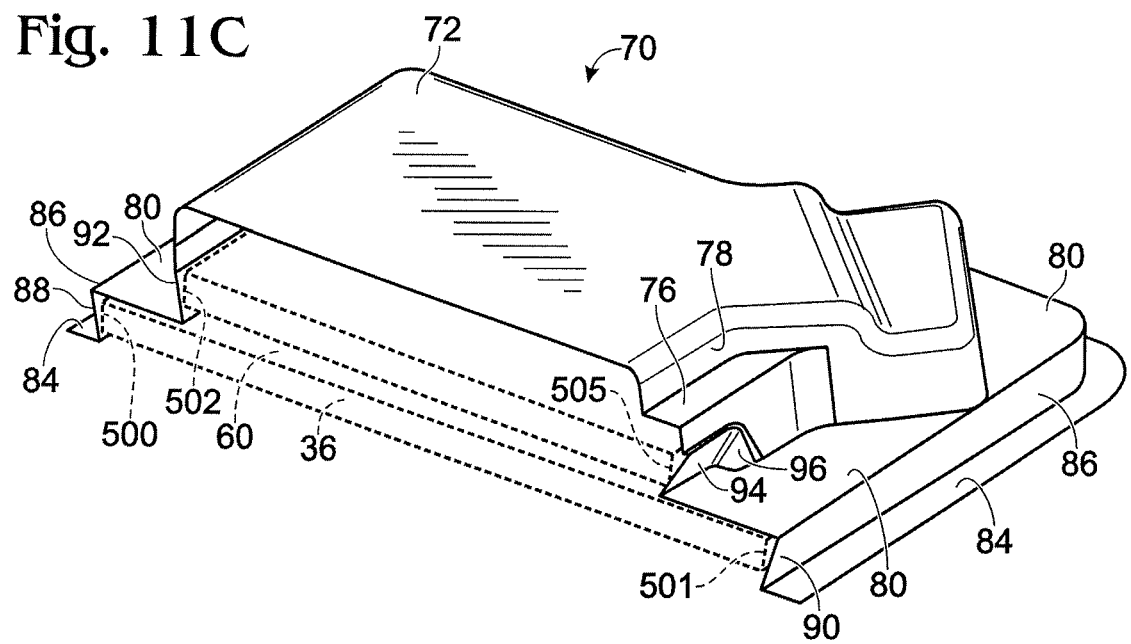

FIGS. 11A-11C are directed to various views of a non-permanent mud cover 70 that is configured to fit over cover 60. As those of ordinary skill in the construction arts will appreciate, a mud cover allows a worker to apply stucco or other such materials over the inner flange 26 during construction without getting the remainder of the assembly soiled by these materials or by other contaminants present on the job site. Once the material has been applied, the cover may be removed and discarded.

Mud cover 70 is configured to removably fit over cover 60, ring 40 and intermediate box 30. Mud cover 70 includes a substantially flat top portion (faceplate) 72 and a sidewall portion 74 that surrounds the top portion. Sidewall portion 74 includes upper plateaus 76 joined to faceplate 72 by walls 78. There are also lower plateaus 80 that are joined to upper plateaus by walls 82, and a lip 84 that is joined to the lower plateaus by walls 86. The exact shape of these walls and plateaus is chosen to roughly conform to the shape of the underlying electrical box assembly.

FIGS. 11B-11C are perspective views of cross section A-A shown in FIG. 11A. FIG. 11B shows the mud cover in aligned relationship with respect to the electrical box assembly 10 in the "X" and "Y" dimensions but not yet pressed onto the electrical box assembly in the "Z" direction. Electrical box assembly 10 includes flange 36 and cover 60, portions of which are shown as dotted lines. Flange 36 has edges 500 and 501 that are substantially parallel to each other. Likewise, Cover 60 includes edges 502 and 505 that are substantially parallel to each other. By comparison, mud cover 70 includes reverse draft portions 88, 90 that taper inwardly with respect to the top of walls 86. The distance separating the inward tapers is less than the distance between edges 500, 501 of flange 36 whereas the top of walls 86 is greater than the distance between edges 500,501. Similarly, reverse draft portions 92, 94 taper inwardly from the top of walls 82. The distance separating these inward tapers is less than the distance between edges 502, 505 of cover 60 whereas the top of walls 82 are greater than the distance between edges 502,505. In one embodiment, the amount of the reverse draft is about 2 degrees.

FIG. 11C shows mud cover 70 being aligned to electrical box assembly 10 in the installed position after having been moved downwardly in the "Z" dimension. Obviously, reverse draft portions 88, 90, 92 and 94 have to deflect outwardly to accommodate the distance between edges 500, 501 and 502, 505. As such, mud cover 70 needs to be made out of flexible material or at least needs to be pliable in the wall portions that include reverse draft. Since the walls including the reverse draft have a natural springiness that tries to return them to their original shape, the mud cover grips the electrical box assembly, being held then by friction fit. The mud cover may be made out of a material such as polyethylene terephthalate, high density polyethylene, or low density polyethylene, and may have a uniform thickness or vary in thickness between 0.005 inches to 0.050 inches. The mud cover may be manufactured using a technology such as vacuum forming, pressure forming, or injection molding.

FIGS. 11B and 11C also show how the reverse draft wall may be advantageously included as just a portion of a side wall. In particular, wall 82 includes a reverse draft portion 94 that ends at an abutting wall 96. Even though draft portion 94 may be in and of itself too flexible to provide sufficient gripping force against edge 505, abutting wall 96 creates a stiffening effect that increases the gripping force. Those skilled in the art will appreciate that there are many variations of the mud cover design that are within the scope of the invention. In one embodiment, abutting walls may be included for increasing the reverse draft gripping force. In another, ribs may be included for increasing the gripping force. In another, the reverse draft portions are disposed in opposing side wall portions. In another, a reverse draft portion is disposed in one side wall without a corresponding reverse draft portion in an opposing side wall. In another, the reverse draft portions are distributed in a plurality of planes within the side wall of the mud cover.

As an added feature, mud cover 70 includes a lip 84. Lip 84 provides the installer an easy way to pull of the mud cover from the electrical box assembly after the installation is complete. Lip 84 surrounds the perimeter of mud cover 70. In an alternate embodiment, lip 84 is provided in at least one portion of the perimeter of mud cover 70. Of course, once the mud cover is removed it can always be reattached to the electrical box assembly if there is motivation to do so.

All references, including publications, patent applications, and patents, cited herein are hereby incorporated by reference to the same extent as if each reference were individually and specifically indicated to be incorporated by reference and were set forth in its entirety herein."

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. An electrical wiring box assembly comprising:
    an inner wall box including a peripheral inner wall bounded and enclosed by a rear wall and open at a front end of the inner wall box to form an inner volume, the inner wall box also including an inner wall flange extending in a substantially perpendicular direction from an exterior surface of the peripheral inner wall at predetermined distance from the front inner wall box end, the inner wall flange including a plurality of apertures formed therein, the inner wall box further comprising a plurality of device mounting bosses extending in a substantially perpendicular direction from an interior surface of the rear wall;
    an intermediate box including a peripheral intermediate wall portion configured to fit within the inner volume, the peripheral intermediate wall being bounded by a rear ledge extending inwardly and perpendicularly from a back end of the peripheral intermediate wall to form an intermediate volume in communication with the inner volume at the back end and open at a front intermediate wall box end, the intermediate box further comprising an outer wall flange extending in a substantially perpendicular direction from an exterior surface of the peripheral intermediate wall at predetermined distance from the front end of the peripheral intermediate wall, a rear wall portion of the outer wall flange being configured to abut the front inner wall box end such that the rear ledge is substantially aligned with the plurality of device mounting bosses; and
    a cover assembly removably coupled to the intermediate box, the cover assembly providing access to the intermediate volume in an open position and substantially sealing the intermediate volume and the inner volume in a closed position.

2. The assembly of claim 1, wherein at least some of the plurality of apertures are configured to accommodate fasteners to thereby mount the inner wall box to a wall structure.

3. The assembly of claim 2, wherein at least some of the plurality of apertures are configured to accommodate a viscous wall structure cover material.

4. The assembly of claim 3, wherein the viscous wall structure cover material is a stucco material.

5. The assembly of claim 1, wherein the cover assembly includes a door cover coupled to a mounting element, the cover assembly being coupled to the intermediate box.

6. The assembly of claim 5, wherein the mounting element includes a cover ring disposed on the outer wall.

7. The assembly of claim 6, wherein the cover ring is disposed over the peripheral intermediate wall abuttingly coupled to the outer wall flange, the cover ring and the door cover providing a weatherproof seal when the door cover is in the closed position.

8. The assembly of claim 7, wherein the door cover is removably connected to the cover ring by a hinge mechanism.

9. The assembly of claim 6, wherein the cover ring is attached to both the intermediate box and the inner box by way of mounting fasteners.

10. The assembly of claim 6, wherein the door cover and the cover ring include a wire entry port formed therein.

11. The assembly of claim 1, further comprising a collar wall extending in a substantially perpendicular direction from the inner wall flange, the collar wall being separated from the peripheral inner wall by a predetermined distance to form a water channel at the front end of the inner wall box.

12. The assembly of claim 11, further comprising a plurality of mounting bosses disposed at predetermined locations within the water channel, the plurality of mounting bosses being configured to accommodate a plurality of fasteners to thereby integrate the inner wall box, the intermediate wall box, and the cover assembly into an integrated assembly.

13. The assembly of claim 11 further comprising at least one drain aperture formed in a bottom portion of the collar wall.

14. The assembly of claim 1, further comprising a pattern formed in the inner wall flange, wherein the pattern includes indented regions configured to retain a viscous cover material such that the viscous cover material adheres to the inner wall flange.

15. The assembly of claim 14, wherein the pattern includes raised linear segments disposed in a cross-hatched pattern on the wall flange.

16. The assembly of claim 1, further comprising a sealing material disposed at a location where the rear portion of the outer flange wall abuts the front inner wall box end.

17. The assembly of claim 16, wherein the sealing material includes a gasket.

18. A temporary and disposable cover for use with the electrical box assembly of claim 1, the cover comprising:
    a faceplate having a surface area substantially corresponding to a front portion of the electrical box assembly;
    a plurality of sidewalls integrally coupled with said faceplate, the faceplate and the plurality of sidewalls being configured to substantially conform to and cover at least a portion of the electrical box assembly by frictional fit, at least one first sidewall of the plurality of sidewalls including a reverse draft that is configured to frictionally engage at least one first corresponding surface of the electrical assembly.

19. The cover of claim 18, further comprising: at least one substantially planar portion coupled to the faceplate and the plurality of sidewalls, the at least one substantially planar portion being configured to substantially conform to and cover the outer wall flange, at least one second sidewall of the plurality of sidewalls including a reverse draft that is configured to frictionally engage at least one second corresponding surface of the electrical assembly.

20. The assembly of claim 1, wherein the distance between the inner wall flange and the outer wall flange is configured to accommodate a wall siding material.

21. An electrical wiring box assembly comprising:
    a peripheral inner wall bounded and enclosed by a rear wall and open at a front end thereof to form an accessible volume,
    a wall flange extending in a substantially perpendicular direction from an exterior surface of the peripheral wall at predetermined distance from the front inner wall box end, the wall flange including a plurality of apertures formed therein, at least some of the plurality of apertures being configured to accommodate fasteners to thereby mount the wall flange to a wall structure;
    a collar wall extending toward the front end in a substantially perpendicular direction from the wall flange, the collar wall being separated from the peripheral inner wall by a predetermined distance to form a water channel;
    a plurality of mounting bosses disposed at predetermined locations within the water channel; and
    at least one drain aperture formed in the collar wall.

22. The assembly of claim 21, further comprising an intermediate box including a peripheral intermediate wall configured to fit within the accessible volume, the peripheral intermediate wall being bounded by a rear ledge extending inwardly and perpendicularly from a back end of the peripheral intermediate wall to form an intermediate volume in communication with the accessible volume at the back end and open at a front intermediate wall box end, the intermediate box further comprising an outer wall flange extending in a substantially perpendicular direction from an exterior surface of the peripheral intermediate wall at predetermined distance from the front end of the peripheral intermediate wall, a rear portion of the outer flange wall being configured to abut the front inner wall box end.

23. The assembly of claim 22, further comprising a plurality of device mounting bosses extending in a substantially perpendicular direction from an interior surface of the rear wall, the rear ledge being substantially aligned with the plurality of device mounting bosses.

24. The assembly of claim 21, further comprising a pattern formed in the wall flange, the pattern being configured to accommodate a viscous cover material such that the viscous cover material adheres thereto.

25. An electrical wiring box assembly comprising:
a peripheral inner wall bounded and enclosed by a rear wall and open at a front end thereof to form an accessible volume; a wall flange extending in a substantially perpendicular direction from an exterior surface of the peripheral inner wall at a predetermined distance from the front inner wall box end, the wall flange including a plurality of apertures formed therein; and a pattern formed in the wall flange, the pattern being configured to accommodate a viscous material such that the viscous material adheres to the wall flange, and a collar wall extending in a substantially perpendicular direction from the wall flange, the collar wall being separated from the peripheral inner wall by a predetermined distance to form a water channel at the front end of the inner wall box.

26. The assembly of claim 25, wherein the wall flange further includes a plurality of holes being configured such that a viscous material adheres thereto.

27. The assembly of claim 25, further comprising at least one drain aperture formed in a bottom portion of the collar wall.

28. The assembly of claim 25, further comprising a plurality of mounting bosses disposed at predetermined locations within the water channel, the plurality of mounting bosses being configured to accommodate a plurality of fasteners.

29. The assembly of claim 25, further comprising an intermediate box including a peripheral intermediate wall portion configured to fit within the accessible volume, the peripheral intermediate wall being bounded by a rear ledge extending inwardly and perpendicularly from a back end of the peripheral intermediate wall to form an intermediate volume in communication with the accessible volume at the back end and open at a front intermediate wall box end, the intermediate box further comprising an outer wall flange extending in a substantially perpendicular direction from an exterior surface of the peripheral intermediate wall at a predetermined distance from the front end of the peripheral intermediate wall.

30. The assembly of claim 29, further comprising a cover assembly removably coupled to the intermediate box, the cover assembly including a door cover, the door cover providing access to the intermediate volume in an open position and substantially sealing the intermediate volume and the inner volume in a closed position.

31. The assembly of claim 30, wherein a plurality of fasteners couple the cover assembly to the mounting bosses.

32. A temporary and disposable cover for use with an electrical assembly, the cover comprising: a faceplate having a surface area substantially corresponding to a front portion of the electrical assembly; a plurality of sidewalls integrally formed with said faceplate, the faceplate and the plurality of sidewalls being configured to substantially conform to and cover at least a portion of the electrical assembly, at least one of the plurality of sidewalls including a reverse draft that is configured to frictionally engage at least one corresponding surface of the electrical assembly and at least one stiffening member such that the disposable cover is attached to the electrical assembly by frictional fit.

33. The cover of claim 32, wherein the electrical assembly includes at least one electrical wiring device.

34. An electrical wiring box assembly comprising:
an inner wall box including a peripheral inner wall bounded and enclosed by a rear wall and open at a front end of the inner wall box to form an inner volume, the inner wall box also including an inner wall flange extending in a substantially perpendicular direction from an exterior surface of the peripheral inner wall at predetermined distance from the front inner wall box end, the inner wall flange including a plurality of apertures formed therein, the inner wall box also including a plurality of fastening structures coupled to the peripheral inner wall, the inner wall box further comprising a plurality of device mounting bosses extending in a substantially perpendicular direction from an interior surface of the rear wall, the inner wall box further including a collar wall extending in a substantially perpendicular direction from the inner wall flange, the collar wall being separated from the peripheral inner wall by a predetermined distance to form a water channel at the front end of the inner wall box; and an intermediate box including a peripheral intermediate wall configured to fit within the inner volume, the peripheral intermediate wall being bounded by a rear ledge extending inwardly and perpendicularly from a back end of the peripheral intermediate wall to form an intermediate volume in communication with the inner volume at the back end and open at a front intermediate wall box end, the intermediate box further comprising an outer wall flange extending in a substantially perpendicular direction from an exterior surface of the peripheral intermediate wall at predetermined distance from the front end of the peripheral intermediate wall, a rear portion of the outer flange wall being configured to abut the front inner wall box end such that the rear edge is substantially aligned with the plurality of device mounting bosses.

35. The assembly of claim 34, wherein the intermediate box is fastened to the inner box by way of fasteners secured to the plurality of fastening structures.

36. The assembly of claim 34, further comprising a pattern formed in the inner wall flange, wherein the pattern includes indented regions configured to retain a viscous cover material such that the viscous cover material adheres to the inner wall flange.

37. The assembly of claim 36, wherein the pattern includes raised linear segments disposed in a cross-hatched pattern on the wall flange.

38. The assembly of claim 34, further including a cover assembly removably coupled to the intermediate box, the cover assembly including a door cover, the door cover providing access to the intermediate volume in an open position and substantially sealing the intermediate volume and the inner volume in a closed position.

39. The assembly of claim 38, wherein the cover assembly includes a door cover coupled to a cover ring, the cover assembly being replaceably coupled to the intermediate box.

40. The assembly of claim 38, wherein the cover assembly is coupled to the inner box by way of fasteners secured to the plurality of fastening structures.

41. The assembly of claim 34 wherein the plurality of fastening structures are disposed at predetermined locations within the water channel.

42. The assembly of claim 34, further including a temporary and disposable electrical box cover, the cover comprising:

a faceplate having a surface area substantially corresponding to a front portion of the electrical box assembly;

a plurality of sidewalls integrally coupled with said faceplate, the faceplate and the plurality of sidewalls being configured to substantially conform to and cover at least a portion of the electrical box assembly by frictional fit, at least one first sidewall of the plurality of sidewalls including a reverse draft that is configured to frictionally engage at least one first corresponding surface of the electrical assembly.

* * * * *